United States Patent
Teixeira

(10) Patent No.: US 12,429,070 B2
(45) Date of Patent: Sep. 30, 2025

(54) FAN DRIVE DEVICE WITH PROPORTIONAL VALVE

(71) Applicant: Robert Bosch GmbH, Stuttgart (DE)

(72) Inventor: Paulo Teixeira, Pomerode-SC (BR)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 18/407,105

(22) Filed: Jan. 8, 2024

(65) Prior Publication Data
US 2024/0240653 A1    Jul. 18, 2024

(30) Foreign Application Priority Data

Jan. 17, 2023    (DE) ..................... 10 2023 200 319.8

(51) Int. Cl.
| | |
|---|---|
| *F15B 13/04* | (2006.01) |
| *F01P 5/04* | (2006.01) |
| *F16H 61/47* | (2010.01) |
| *F01P 7/04* | (2006.01) |
| *F15B 11/04* | (2006.01) |

(Continued)

(52) U.S. Cl.
CPC .......... *F15B 13/0402* (2013.01); *F01P 5/043* (2013.01); *F16H 61/47* (2013.01); *F01P 7/044* (2013.01); *F15B 11/04* (2013.01); *F15B 2013/008* (2013.01); *F15B 2211/30525* (2013.01); *F15B 2211/3116* (2013.01); *F15B 2211/3144* (2013.01); *F15B 2211/327* (2013.01); *F15B 2211/351* (2013.01); *F16H 61/4061* (2013.01); *F16H 61/4148* (2013.01)

(58) Field of Classification Search
CPC .......... F15B 13/0402; F15B 2211/3144; F15B 2211/7058; F15B 11/04; F15B 2013/008; F15B 2211/30525; F15B 2211/3116; F15B 2211/327; F15B 2211/351; F01P 5/043; F01P 7/044; F16H 61/47; F16H 61/4061; F16H 61/4148
See application file for complete search history.

(56) References Cited

U.S. PATENT DOCUMENTS 3,942,486 A * 3/1976 Kirchner ................ F01P 7/044
60/329
5,236,015 A * 8/1993 Schwelm ............ F15B 13/0435
137/625.48

(Continued)

FOREIGN PATENT DOCUMENTS

CN    205064457    *    3/2016    ............... E02F 9/00

*Primary Examiner* — Dustin T Nguyen
(74) *Attorney, Agent, or Firm* — Maginot, Moore & Beck LLP

(57) ABSTRACT

A fan drive device for use with a hydraulic pump featuring a constant displacement volume is disclosed. The fan drive device includes a hydraulic motor configured to be directly coupled to a fan. The hydraulic motor includes a first working connection, a second working connection, and a constant displacement volume. The fan drive device further includes a hydraulic valve having a pump connection and a tank connection. The hydraulic valve includes two fluid connections, each of which can be fluidically connected to the hydraulic motor. The hydraulic valve is designed as a proportional valve including a continuously adjustable control piston proportional to a control current of the hydraulic valve as the sole control mechanism for controlling the fan speed.

15 Claims, 7 Drawing Sheets

(51) Int. Cl.
*F15B 13/00* (2006.01)
*F16H 61/4061* (2010.01)
*F16H 61/4148* (2010.01)

(56) References Cited

U.S. PATENT DOCUMENTS

| | | | | |
|---|---|---|---|---|
| 6,076,488 | A * | 6/2000 | Yamagishi | F01P 7/044 |
| | | | | 123/41.31 |
| 6,460,623 | B1 * | 10/2002 | Knussman | F15B 11/16 |
| | | | | 111/926 |
| 6,612,544 | B2 * | 9/2003 | Sakata | F01L 1/34 |
| | | | | 251/129.2 |
| 9,388,912 | B2 * | 7/2016 | Funakubo | F16K 47/023 |
| 11,399,460 | B1 * | 8/2022 | Baiocchi | H02K 49/106 |
| 12,129,784 | B2 * | 10/2024 | Byun | F01P 5/02 |
| 2008/0056887 | A1 * | 3/2008 | Iannizzaro | F04C 2/086 |
| | | | | 417/313 |

\* cited by examiner

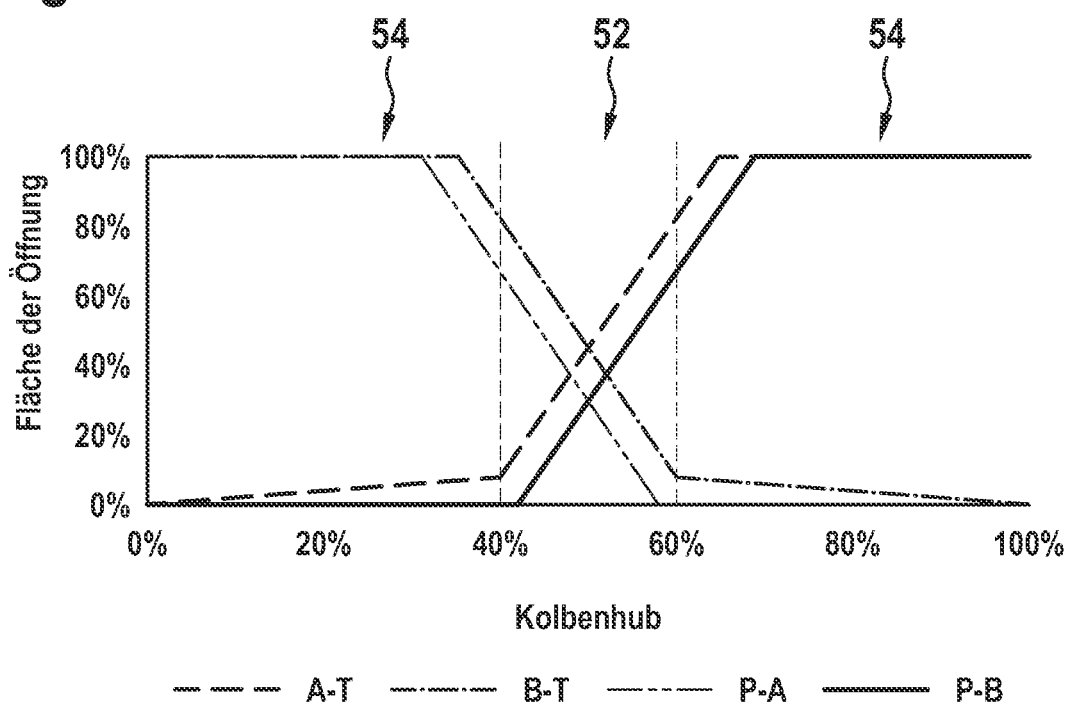

FAN DRIVE DEVICE WITH PROPORTIONAL VALVE

This application claims priority under 35 U.S.C. § 119 to patent application no. DE 10 2023 200 319.8, filed on Jan. 17, 2023 in Germany, the disclosure of which is incorporated herein by reference in its entirety.

The present disclosure relates to a hydraulic fan drive device having a proportional valve.

BACKGROUND

Known hydraulic fan drive devices comprise a hydraulic motor directly coupled to a fan. Such a hydraulic motor typically has two working connections and a constant displacement volume. The two working connections are each connected to a fluid connection of a switching valve. In this case, the switching valve is a 4/2-way valve having a pump connection and a tank connection. The pump connection is connected to a hydraulic pump featuring a constant displacement volume via a fluid line. The tank connection is connected to a tank via a fluid line. In a spring-pretensioned initial position of the switching valve (design position), the pump line is connected to the first working connection of the hydraulic motor and the tank line is connected to the second working connection of the hydraulic motor. As a result, the hydraulic motor is driven in a predetermined first direction of rotation. The switching valve can be switched to a working position by applying a current to an electromagnet. In the working position, the pump line is connected to the second working connection and the tank line is connected to the first working connection of the hydraulic motor. As a result, the preceding first direction of rotation of the hydraulic motor is reversed into a second direction of rotation. The rotational speed of the fan is in this case proportional to the fluid pressure provided by the hydraulic pump in both positions of the switching valve.

Given that the hydraulic pump provides a constant displacement volume, the rotational speed of the fan is controlled by an additional proportional pressure relief valve. Working fluid can be drained from the pump line into the tank line via the pressure relief valve, thereby reducing the pressure in the hydraulic system and thus the rotational speed of the fan.

Another check valve between the pump and tank lines provides a smooth stop of the hydraulic motor when the hydraulic pump is switched off. If the hydraulic pump stops, the hydraulic motor continues to rotate due to its inertia. If there is no longer a flow through the hydraulic motor, a sudden standstill occurs with the risk of cavitation. However, the check valve enables the flow to partially flow back from the outlet (tank line) to the inlet (pump line) of the switching valve, causing the hydraulic motor to stop progressively.

The disadvantage of these known solutions is that two hydraulic valves are required, namely the pressure relief valve and the switching valve, which must be controlled independently of each other. The two hydraulic valves require a relatively large installation area and each of the hydraulic valves requires its own electrical signal and thus its own cabling, which is expensive and also takes up installation area.

SUMMARY

Therefore, the object of the present disclosure is to overcome or at least reduce the disadvantages of the prior art and in particular to provide a fan drive device featuring a small installation area and simple control.

This object is achieved by a fan drive device according to the features described below.

The present disclosure therefore relates to a fan drive device for use with a hydraulic pump having a constant displacement volume, in particular for directly driving a fan rotor. The fan drive device comprises, among other things, a hydraulic motor configured to be directly coupled to a fan or fan rotor. The hydraulic motor comprises a first working connection A and a second working connection B and preferably features a constant displacement volume. The fan drive device further comprises a hydraulic valve having a pump connection P, a tank connection T, and two further fluid connections, whereby the two further fluid connections can each be fluidically connected to the two working connections A, B of the hydraulic motor. According to the present disclosure, the hydraulic valve is designed as a proportional valve having a continuously adjustable control piston or control slider proportional to a control current of the hydraulic valve as the sole control means for controlling the fan speed.

In other words, the hydraulic valve is arranged in fluid lines between the working connections of the hydraulic motor and the hydraulic pump and the tank. The hydraulic valve is in this case designed as the proportional valve, so that the control piston can continuously (fluidically) disconnect or (fluidically) connect the fluid connections of the hydraulic valve. The continuously adjustable control behavior of the hydraulic valve can be used to control a fluid pressure provided by the hydraulic pump and is applied to at least one working connection of the hydraulic motor. By controlling the fluid pressure applied to the hydraulic motor using the hydraulic valve as the sole control means, the rotational speed of the hydraulic motor, and thus the fan, can be controlled.

So, the area or the aperture cross-section of the fluid connections of the hydraulic valve can be changed by the position of the movable control piston in the hydraulic valve. The continuously movable control piston therefore enables the flow of working fluid through the apertures to be adjusted. As a result, the working fluid flow can be continuously adjusted by moving the control piston. The working fluid flow arriving at the hydraulic motor can therefore be used to control the rotational speed of the fan via the position of the control piston in the hydraulic valve.

In this context, the fan drive device according to the disclosure has the following advantages. A pressure relief valve, as known from the prior art, which controls the rotational speed of the fan, is therefore superfluous. In other words, the two hydraulic valves known from the prior art can be combined together to form a (single) hydraulic valve. A single hydraulic valve requires less installation area than two separate hydraulic valves. Furthermore, fewer components are needed, thus reducing the complexity and cost of the assembly. A single hydraulic valve only requires a single electronic signal for control, whereas two hydraulic valves each require a separate electronic signal. As a result, the control of the fan drive device and the overall electrical system can be designed more easily because fewer cables and/or performance improving means are needed.

Advantageous embodiments of the present disclosure are the subject of the accompanying description.

The hydraulic valve preferably comprises a control piston, which is movably mounted in a control cylinder of the hydraulic valve and which controls a first, a second, a third, and a fourth aperture, which connect the individual fluid connections of the hydraulic valve and whose aperture cross-sections can each be adjusted by a movement of the control piston.

In other words, the control piston forms control edges that separate or release the fluid connections of the hydraulic valve. By moving the control piston, and thus the control edges, the aperture cross-sections of the fluid connections can be adjusted.

The pump connection P is preferably connected or can be connected to the first working connection A only via the first aperture and to the second working connection B only via the second aperture. The tank connection T is preferably permanently connected in parallel to a first auxiliary chamber or connection T1 and a second auxiliary chamber or connection T2, whereby the first working connection A can only be connected to the first auxiliary chamber T1 via the third aperture, and the second working connection B can only be connected to the second auxiliary chamber T2 via the fourth aperture. The respective control edges can thereby adjust the aperture cross-sections between the individual fluid connections.

So, the first aperture (P-A) can connect the pump connection P to the first working connection A. The second aperture (P-B) can connect the pump connection P to the second working connection B. The third aperture (A-T1) can connect the first working connection A to the first auxiliary chamber T1 and the fourth aperture (B-T2) can connect the second working connection B to the second auxiliary chamber T2.

According to an optional aspect of the present disclosure, the control piston has a first end position, in particular a spring-pretensioned end position, in which the first working connection A is connected to the pump connection P and the second working connection B is connected to the tank connection T. Furthermore, the control piston can feature a second end position opposite the first end position, in which the first working connection A is connected to the tank connection T and the second working connection B is connected to the pump connection. The control piston can feature a middle position, preferably 50% of the total piston stroke, which is located halfway between the first and second end position, in which case the third aperture (A-T1) and the fourth aperture (B-T2) feature the same first aperture cross-section.

In other words, the aperture cross-sections of the control piston can each be adjusted continuously and simultaneously by moving the control piston. The control piston is pressed into the first end position by a spring or is pretensioned by the spring in the first end position. A continuously adjustable solenoid valve is provided, whereby the control piston can be pressed by a coil of the solenoid valve into the second end position opposite the first end position. The solenoid valve is configured such that any intermediate position of the control piston between the first end position and the second end position can be adjusted by supplying a suitable electrical current to the solenoid valve.

The piston stroke can be a defined travel path of the control piston in the control cylinder or relative to the fluid connections of the hydraulic valve.

In the middle position of the hydraulic valve, a short circuit can therefore be present between the pump connection P and the tank connection T, so that only part of the delivery flow or fluid flow of the hydraulic pump flows via the hydraulic motor. The remainder of the delivery flow can flow directly to the tank from the hydraulic pump via this short circuit. By adjusting the hydraulic valve, the ratio of these two partial flows can therefore be adjusted to set the rotational speed of the hydraulic motor. The short circuit can always occur if both the pump connection P and the tank connection T are connected to the same working connection (A or B). This can be the case in particular in all positions of the hydraulic valve outside of the end positions. In the middle position, this short circuit can be particularly pronounced because the direction of rotation of the hydraulic motor is reversed there, whereby the hydraulic motor can come to a standstill. The entire delivery flow of the hydraulic pump can then flow directly from the hydraulic pump into the tank. Without this short circuit, the speed of the hydraulic motor could depend solely on the delivery flow of the hydraulic pump, no matter what position the hydraulic valve is in.

According to a further optional aspect of the present disclosure, the first aperture cross-section of the third aperture (A-T1) and the fourth aperture (B-T2) in the middle position is at least 30%, preferably 35%, of their fully open area or maximum aperture cross-section. The first aperture (P-A) and the second aperture (P-B) can be fully closed in the middle position or preferably feature an aperture cross-section that is at most 90% of the first aperture cross-section.

Preferably, in the middle position (of the control piston), the aperture cross-sections of the first aperture (P-A) and the second aperture (P-B) are each the same size. In other words, the surface area of the first and the second aperture through which working fluid can flow can be the same size in the middle position.

In the middle position, the same amount of working fluid can flow from the pump connection P to the working connections A and B. Likewise, the same amount of working fluid can also flow from working connections A and B to tank connection T. The hydraulic motor can therefore be in a neutral position in the middle position and not rotate.

Preferably, the third aperture (A-T1) and the fourth aperture (B-T2) are open at a control piston position outside the first and second end positions, whereby their aperture cross-section depends on the piston stroke of the control piston. In particular, the ratio of the two apertures or aperture cross-sections to each other can depend on the piston stroke.

As explained hereinabove, the respective aperture cross-sections of the third and fourth apertures can be the same in the middle position.

According to a further optional aspect of the present disclosure, the aperture cross-section of the first aperture (P-A) and the fourth aperture (B-T2) decreases monotonically with increasing piston stroke. In the first end position, the two apertures are fully open. As the piston stroke increases, the (active) cross-section of the apertures becomes smaller and smaller.

Preferably, the surface area of the second aperture (P-B) and the third aperture (A-T1) increases monotonically with increasing piston stroke. In the first end position, the two apertures are fully closed. As the piston stroke increases, the aperture cross-section of the apertures increases.

According to a further optional aspect of the present disclosure, curves of the aperture cross-section of the respective apertures feature a flat area and a steep area, whereby the control piston position defines the start of the flat area in which the respective aperture is closed. When an aperture is fully or completely closed and opened by the piston stroke, the aperture cross-section first increases slowly (flat area) and increases more rapidly in the steep area. The control behavior of the fan is improved as a result.

Preferably, the flat area corresponds to 30% to 45% of the piston stroke or travel path of the control piston. The remaining portion of the piston stroke can thereby represent the steep area of the curve of the aperture cross-section.

The first (P-A) and second (P-B) apertures can be completely closed in the flat area. Given that the aperture between the pump connection and the working connections in the flat area is either fully open or fully closed, and the apertures between the working connections and the tank connection T are at least partially open, the rotational speed of the hydraulic motor in the flat area is controlled by the apertures between the working connections and the tank connection T.

The areas or aperture cross-sections of the third (A-T) and fourth (B-T) aperture can be 15% of the maximum area of the respective aperture at the end of the flat area.

According to a further, optional aspect of the present disclosure, all apertures beyond a limit value of the piston stroke of the control piston are fully open or fully closed. The limit value can be less for the connections between the tank connection T and the working connections than for the connections between the working connections and the pump connection P. The limit value can, e.g., be 60% of the total piston stroke of the control piston. In addition, a piston stroke of over 60% of the total piston stroke can feature either fully open or fully closed apertures. Preferably, the limit value can also be 40%, and a piston stroke of below 40% of the total piston stroke can mean either fully open or fully closed apertures.

Preferably, the aperture area or the aperture cross-section of the third (A-T) and fourth (B-T) aperture in each partially opened state is greater than the corresponding aperture area or the corresponding aperture cross-section of the first (P-A) and second aperture (P-B). As a result, the aperture of the pump connection P controls the fluid pressure to the hydraulic motor and thus the rotational speed of the fan.

According to a further optional aspect of the present disclosure, the hydraulic motor is a gear motor, preferably having an outer gear cog. The hydraulic motor comprises a housing having a main body arranged between a first end plate and a second end plate, whereby the control piston, spring, and solenoid valve are arranged within or on the first end plate.

Preferably, a pilot valve is arranged within or on the first end plate. The pilot valve is then arranged within or on the first end plate when the hydraulic valve is hydro-electrically controlled, and the pilot valve controls the fluid flow to one end face of the control piston.

Preferably, the surface area of the fully opened apertures is 126.45 mm².

According to a further optional aspect of the present disclosure, the hydraulic valve is electrically controlled. The control piston can in this case be electrically moved directly by a control current via a solenoid coil.

Preferably, the hydraulic valve is hydroelectrically controlled. The pilot valve thereby controls a fluid flow from a fluid line to an end face of the control piston depending on a control current. The fluid pressure controlled by the pilot valve moves the control piston. Hydroelectric control is particularly advantageous at high pressures in the hydraulic system and high loads.

The directly electrically controlled hydraulic valve and the hydroelectrically controlled hydraulic valve can have in common that the control piston is moved depending on the control current, so the control current causes the fluid flow through the hydraulic valve. The control current can therefore affect the rotational speed of the hydraulic motor and thus the fan.

The disclosure will be explained in more detail hereinafter by way of preferred embodiments with reference to the accompanying drawings.

BRIEF DESCRIPTION OF THE DRAWINGS

FIG. 7 shows a piston stroke/aperture cross-section plot.

DETAILED DESCRIPTION

Figure 1:
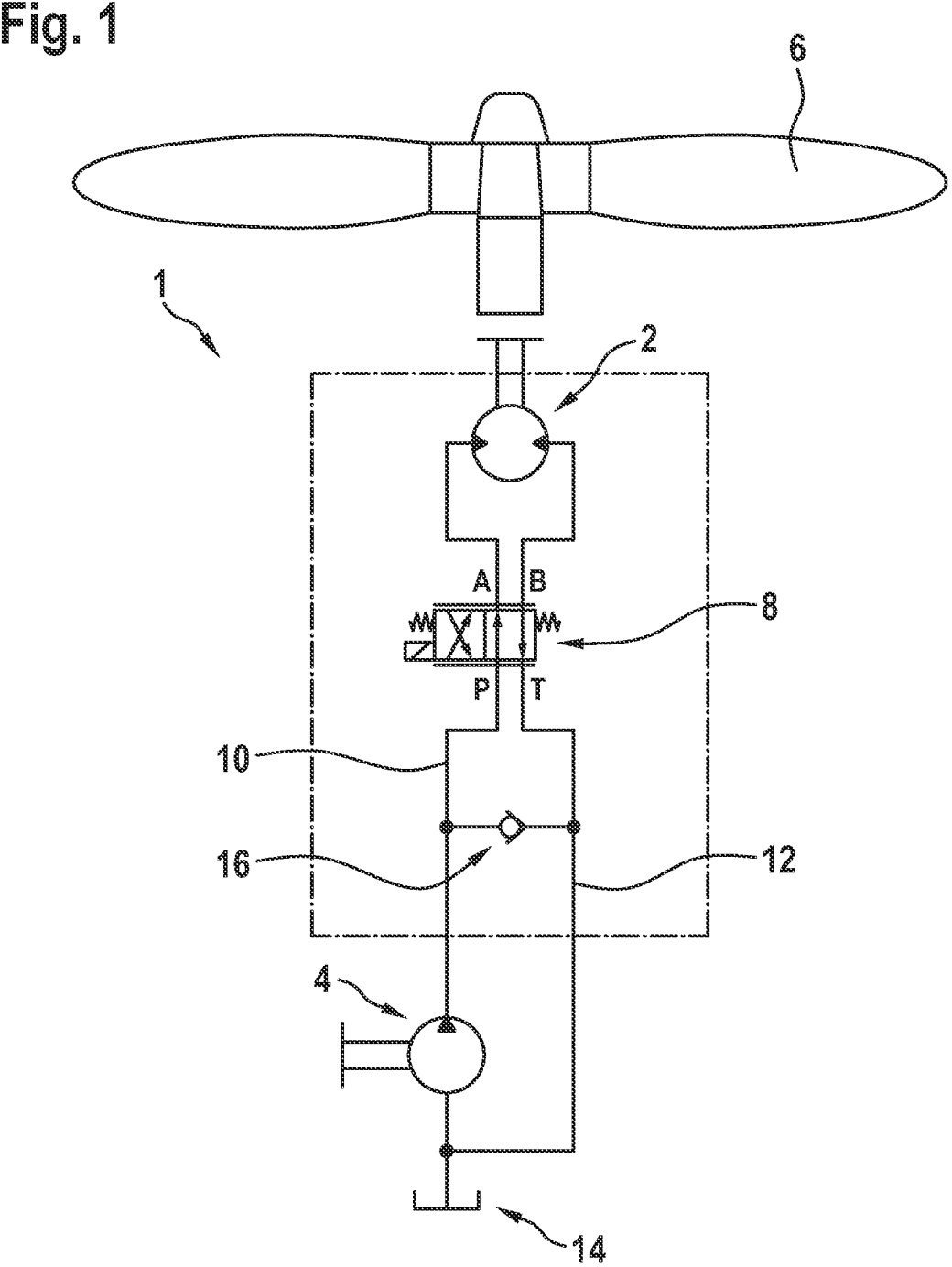
FIG. 1 shows a schematic illustration of a fan drive device according to the present disclosure.

FIG. 1 shows a fan drive device 1. The fan drive device 1 comprises a hydraulic motor 2, a hydraulic pump 4, a fan 6, and a hydraulic valve 8. The hydraulic motor 2 is directly coupled to the fan 6. The hydraulic motor 2 has a first working connection A and a second working connection B and a constant displacement volume. The hydraulic pump 4 likewise features a constant displacement volume. The hydraulic valve 8 is arranged in a fluid line between the hydraulic pump 4 and a (hydraulic) tank 14 and the two working connections A, B of the hydraulic motor 2. The hydraulic valve 8 is designed as a 4/2-way proportional valve. A pump connection P of the hydraulic valve 8 can be connected to the hydraulic pump 4 via a fluid or pump line 10. A tank connection T can be connected to the tank 14 via a fluid line or tank line 12. Two connections of the hydraulic valve 8 can each be connected to the first working connection A via a fluid line and to the second working connection B of hydraulic motor 2. The hydraulic valve 8 is spring-pretensioned and can be actuated electrically. The fan drive device 1 comprises a check valve 16 arranged in a line between the pump line 10 and the tank line 12.

FIGS. 2a to 2e each show longitudinal sections through the hydraulic valve 8. The hydraulic valve 8 comprises a control piston 18 which is movably mounted along a longitudinal axis in a control cylinder 20 of the hydraulic valve 8. The control piston 18 forms a number of control edges 22. The hydraulic valve 8 has the pump connection P, the first working connection A, the second working connection B and two auxiliary connections or chambers T1 and T2, which are permanently connected to the tank connection T. By moving the control piston 18, the control edges 22 can cover or connect the fluid connections A, B, P, T of the hydraulic valve 8, and thereby connect the respective fluid lines to each other.

The control piston 18 can in this case control (open) a first aperture 24 between the first working connection A and the pump connection P, a second aperture 26 between the pump connection P and the second working connection B, a third aperture 28 between the first auxiliary connection T1 and the first working connection A, and a fourth aperture 30 between the second working connection B and the second auxiliary connection T2. The apertures are each defined by the control edges 22.

Figure 2A:
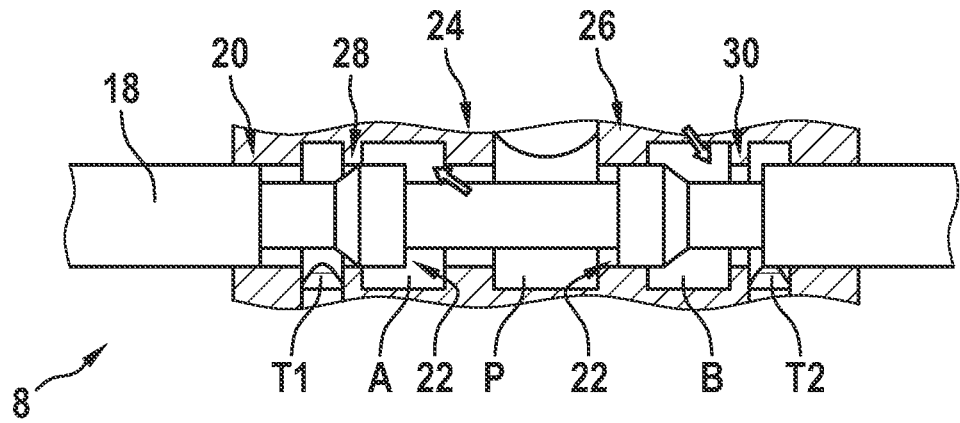
FIGS. 2a to e shows sectional views through a hydraulic valve of the fan drive device according to the present disclosure.
Figure 2B:
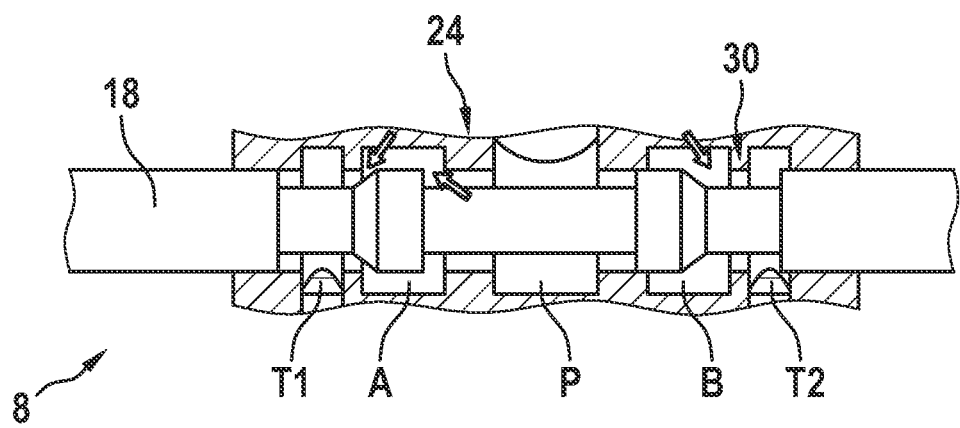
Figure 2C:
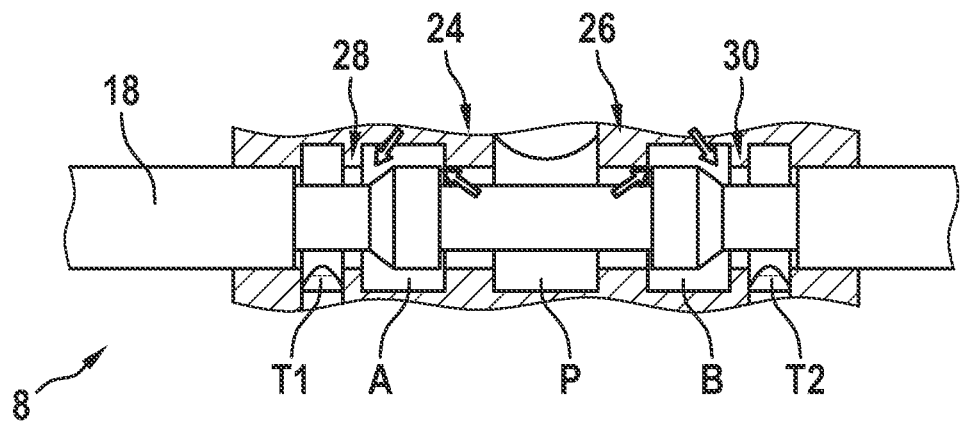
Figure 2D:
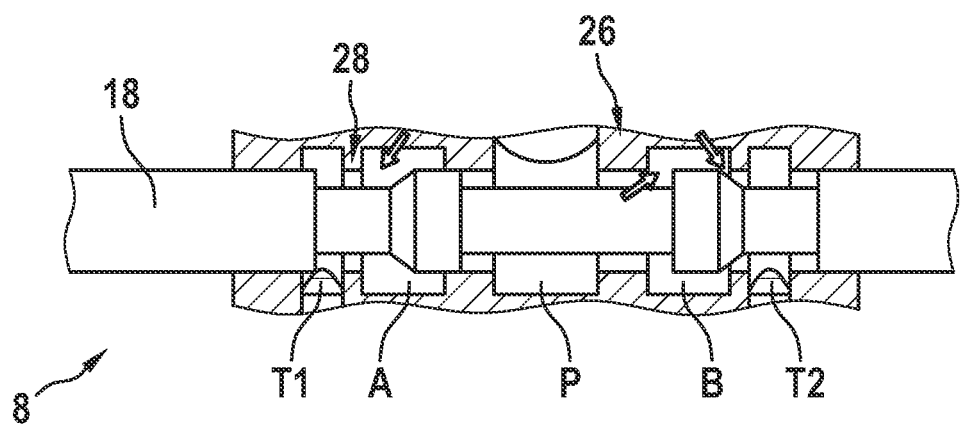
Figure 2E:
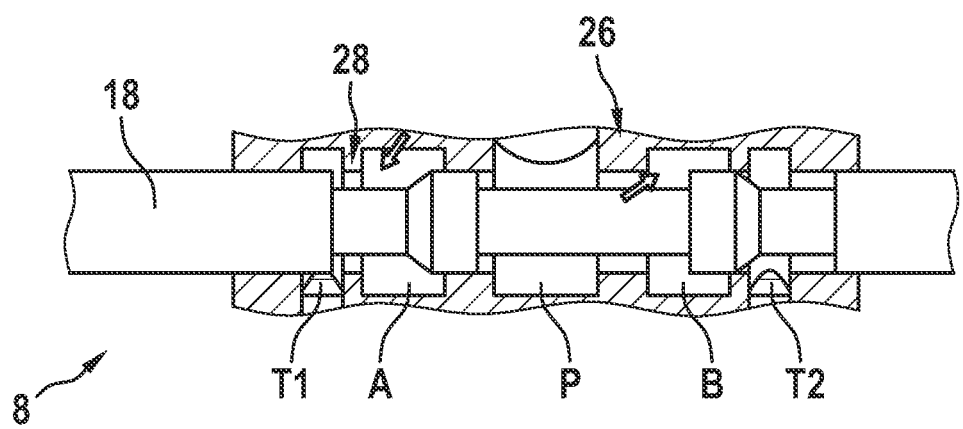

FIGS. 2a to 2e show the control piston 18 in different positions in the control cylinder 20 or with a different piston stroke of the control piston 18. FIG. 2a shows the control piston 18 in a first spring-pretensioned end position. The first aperture 24 of the control piston 18 in this case connects the pump connection P to the first working connection A and the fourth aperture 30 of the control piston 18 connects the second working connection B to the tank connection T2. The connections between the first working connection A and the first auxiliary connection T1 and between the second working connection B and the pump connection P are blocked by the control edges 22. FIG. 2e shows the control piston 18 in a second end position opposite the first end position. The third aperture 28 in this case connects the tank connection T1 to the first working connection A and the second aperture 26 connects the pump connection P to the second working connection B. The connections between the second working connection B and the second auxiliary connection T2 and between the first working connection A and the pump connection P are blocked from the control edges 22 in the second end position. FIGS. 2b to 2d show intermediate positions of the control piston 18 between the two end positions. FIG. 2c shows the control piston 18 in a middle position that is exactly halfway between the first and second end positions. In this case, the third aperture 28, which connects the first auxiliary terminal T1 and the working connection A and the fourth aperture 30, which connects the second auxiliary connection T2 and the second working connection B, are the same size. The first aperture 24, which connects the first working connection A and the pump connection and the second aperture, which connects the second working connection A and the pump connection P, are also the same size.

The operation of the fan drive device 1 will be described hereinafter. The hydraulic motor 2 is driven by the fluid pressure generated by the hydraulic pump 4. The hydraulic motor 2 in turn drives the fan 6. When the control piston 18 of the hydraulic valve 8 is in the first end position, the fluid pressure is applied to the first working connection A. The fan 6 rotates in a first direction of rotation. When the control piston 18 is in the second end position, the fluid pressure of the hydraulic pump 4 is applied to the second working connection B. The fan 6 then rotates in the opposite direction to the first direction of rotation. The direction of rotation of the fan 6 can therefore be controlled by switching the hydraulic valve 8. The rotational speed of the fan 6 is proportional to the fluid pressure in the hydraulic system or fan drive device 1, which drives the hydraulic motor 2.

By moving the control piston 18, the area of apertures 24, 26, 28, 30 of the hydraulic valve 8 can be changed or varied. The control piston 18 in FIG. 2b is then moved relative to the first end position (shown in FIG. 2a). The area of the first aperture 24 is thereby reduced. At the same time, the third aperture 28 is minimally opened between the first working connection and the first auxiliary connection T1. Therefore, not all of the fluid pressure generated by the hydraulic pump 4 reaches the first working connection A, as is the case in the first end position, but a portion of the fluid pressure is released into the tank line 12. As a result, less fluid pressure is applied to the hydraulic motor 2 and the rotational speed of the fan 6 is reduced accordingly. The rotational speed of the fan 6 can then be controlled by continuously moving the control piston 18 of the hydraulic valve 8. In the middle position shown in FIG. 2c, the same pressure is applied to both working connections A and B, while the aperture areas between the working connections A and B and auxiliary connections T1 and T2 are the same size. This position therefore corresponds to a neutral position, and the fan 6 does not rotate.

The check valve 16 ensures a smooth stop of the hydraulic motor 2 when the hydraulic pump 4 is switched off. If the hydraulic pump 4 stops, then the hydraulic motor 2 continues to rotate due to its inertia. If there is no longer a flow through the hydraulic motor 2, a sudden standstill can occur with the risk of cavitation. The check valve 16 enables the flow to partially flow back from the tank line 12 to the pump line 10, causing the hydraulic motor 2 to stop progressively.

Figure 3:
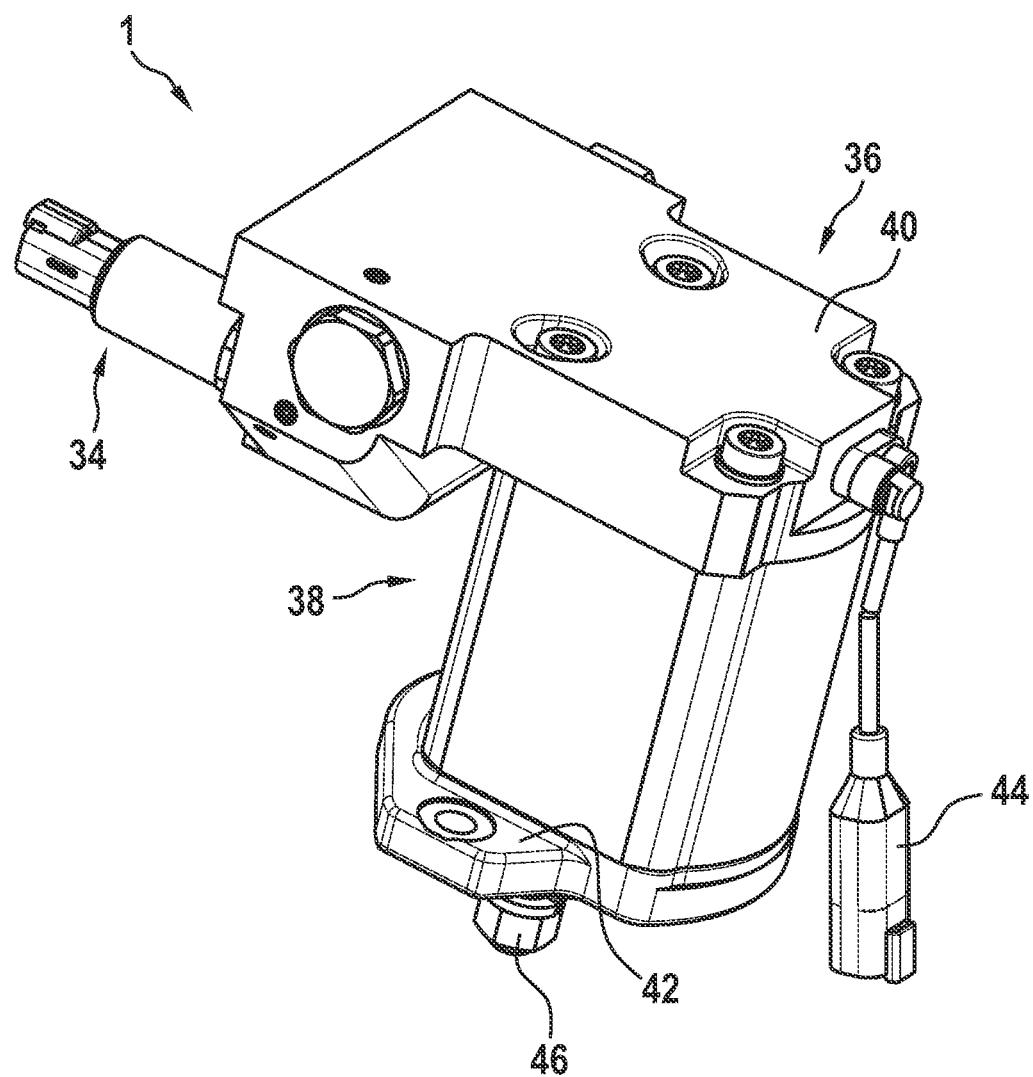
FIG. 3 shows a perspective view of the fan drive device according to the present disclosure.

FIG. 3 shows a perspective view of the fan drive device 1. The fan drive device 1 comprises a housing 36 having a housing main body 38 arranged between a first end plate 40 and a second end plate 42. The hydraulic motor 2 is accommodated in the housing main body 38. The solenoid valve or pilot valve 34 is fixed to the housing 36. Furthermore, an electrical connector or plug 44 is attached to the housing 36. An output shaft 46 protrudes from one of the end plates of the housing 36, via which torque is transferred from the hydraulic motor 2 to the fan 6 (not shown in FIG. 3).

Figure 4:
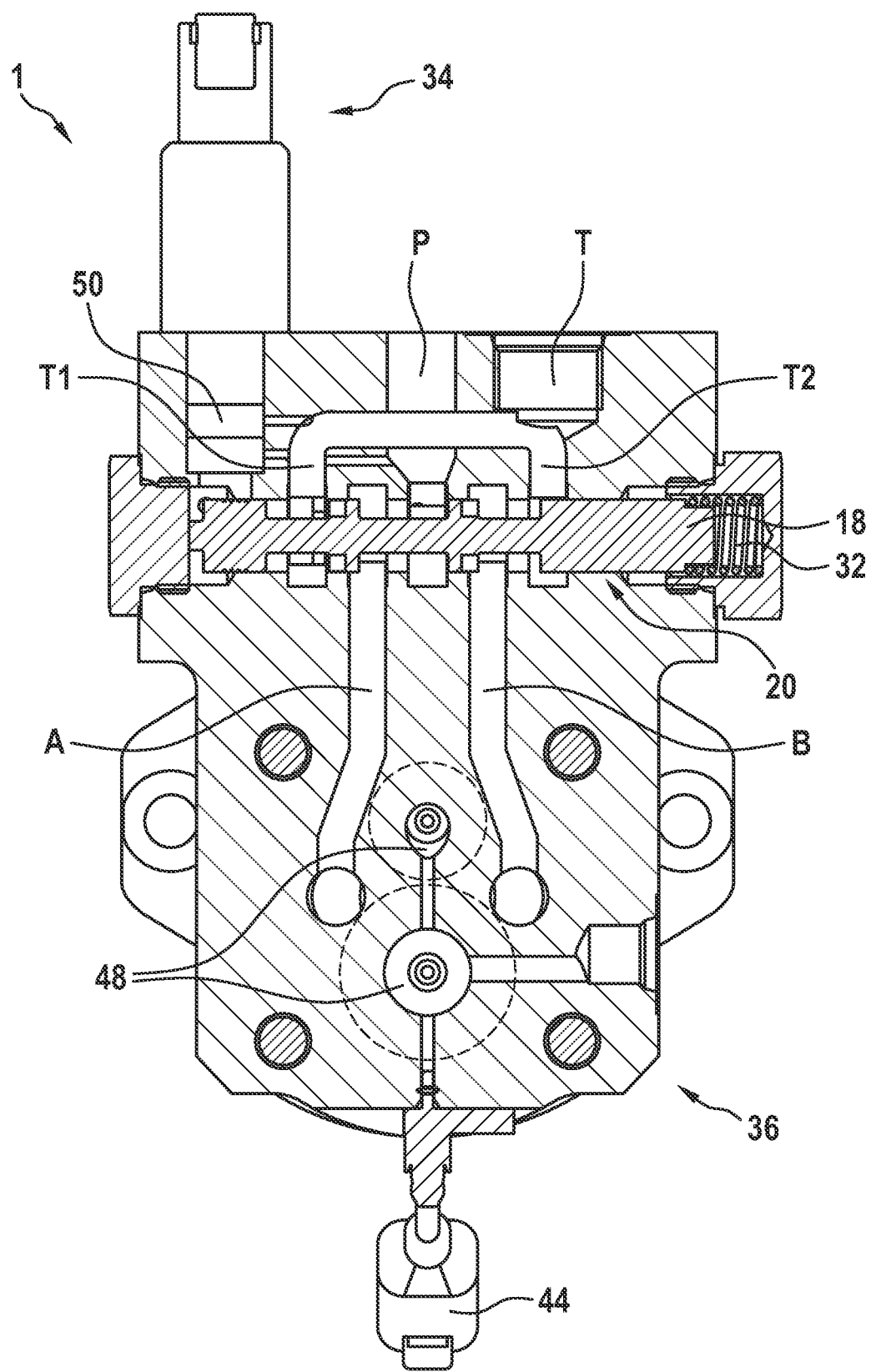
FIG. 4 shows a cross-section through the fan drive device according to the present disclosure.

FIG. 4 shows a cross-section through the fan drive device 1. The control piston 18 is movably arranged in the control cylinder 22 or valve housing. The control piston 18 is pretensioned by a spring 32 in the first end position. The pump connection P is prepared to be connected to the pump line 10. The tank connection T is prepared to be connected to the tank line 12. The two working connections A and B are connected to the two working connections A and B of the hydraulic motor 2. The hydraulic motor 2 is directly coupled to the fan 6.

The hydraulic motor 2 is preferably a gear motor. For this purpose, the hydraulic motor 2 comprises two outward gear cogs 48, which mesh with one another. However, it is of course conceivable that other known hydraulic motors 2, e.g., a ring gear motor, vane motor, or axial piston motor can be used.

The control piston 18 in the depicted embodiment can be electro-hydraulically actuated. For this purpose, the fan drive device 1 comprises the electrically actuated pilot valve 34, which controls fluid flow from the tank or pump connection T, P to an end face of the control piston 18. The fluid pressure controlled by the pilot valve 34 actuates the control piston 18. This is particularly advantageous when high delivery flows or pressures are provided in the hydraulic system. However, it is also conceivable to directly actuate the control piston 18 by means of an electrical solenoid coil.

Figure 5:
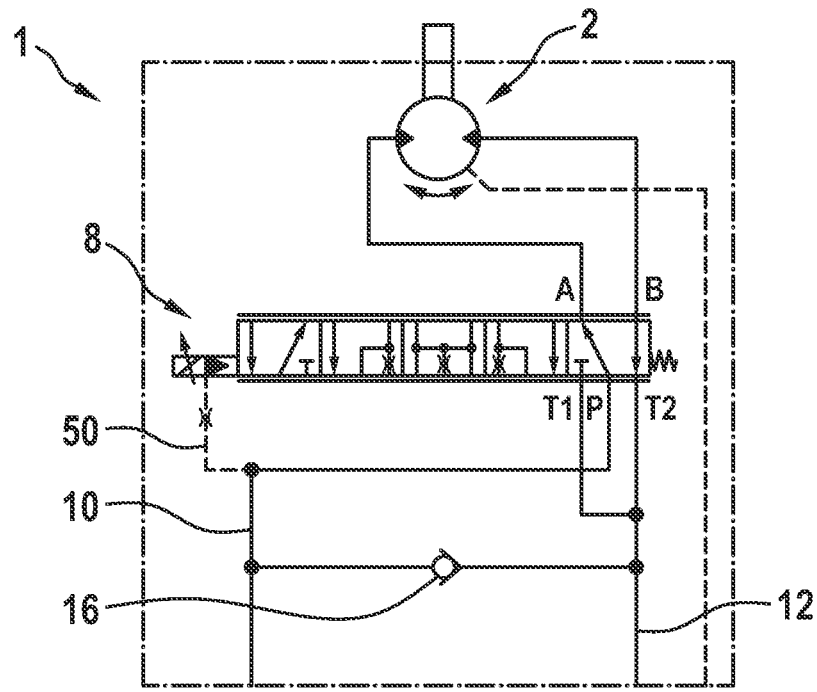
FIG. 5 shows a schematic illustration of the fan drive device according to the present disclosure.

FIG. 5 shows a schematic illustration of the fan drive device 1 comprising the electro-hydraulically controlled hydraulic valve 8. The continuously adjustable positions of the control piston 18 are in this case shown as five discrete intermediate positions. In the first spring-pretensioned end position, the pump connection P is connected to the first working connection A and the second working connection B is connected to the tank connection T. In the second end position, the first working connection A is connected to the tank connection T and the pump connection P is connected to the second working connection B. In the intermediate positions, the respective working connections are each connected in a throttled manner. In the middle position, both the working connections A and B are connected to the pump connection P and the tank connection T in a throttled manner. The hydraulic valve is hydraulically switched, whereby the fluid pressure comes from the pump line 10 or the tank line 12 and controlled by the pilot valve 34. The fluid pressure is, e.g., directed through a pilot pressure fluid line 50 from the pump line 10 or the tank line 12 to the end face of the control piston 18.

Figure 6:
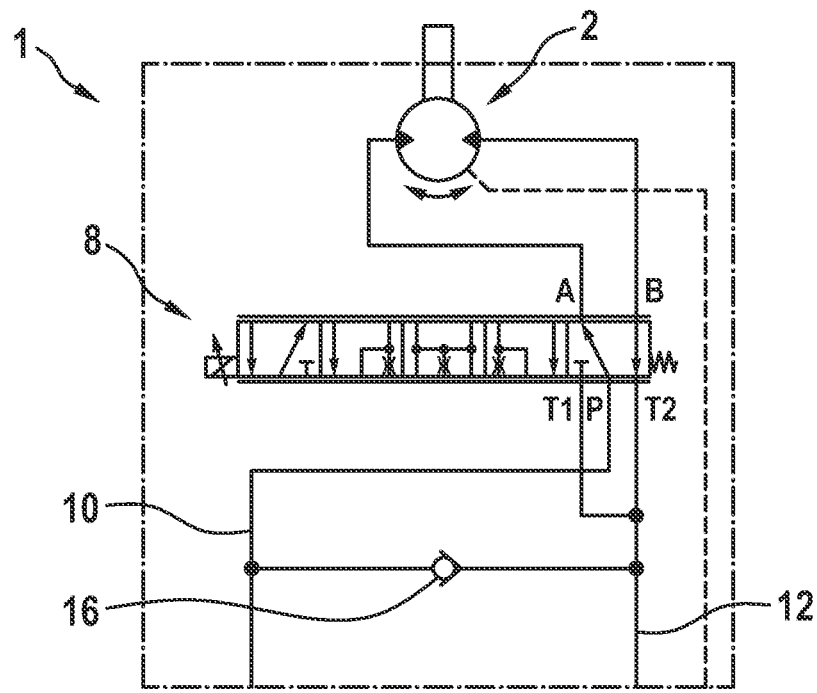
FIG. 6 shows a schematic illustration of a fan drive device according to a further embodiment of the present disclosure.

FIG. 6 shows a schematic illustration of the fan drive device 1 comprising an electrically controlled hydraulic valve 8. In this case, the pilot valve 34 is omitted and the hydraulic valve 8 is directly controlled electronically. Both embodiments have in common that the fluid pressure through the hydraulic valve 8 can be controlled by an electrical control current. Therefore, a direct correlation in both embodiments exists between the electronic control current and the rotational speed of the fan 6.

FIG. 7 shows a surface area of the respective aperture cross-section as a function of the position or the piston stroke of the control piston 18. In the diagram, the surface areas of the respective apertures are shown depending on the position of the control piston 18. The behavior of the hydraulic valve 8 can be divided into five distinct phases. The first end position corresponds to, e.g., a displacement of the control piston 18 by 0-8% of the total piston stroke. In the first end position, the first aperture 24 between the first working connection A and the pump connection P is fully open, and the fourth aperture 30 between the second working connection B and the tank connection T is also fully open. The second aperture 26 between the second working connection B and the pump connection P, and the third aperture 28 between the working connection A and the tank connection T are both closed. In this position, the fan 6 runs in the first direction of rotation at the maximum rotational speed. When the control piston 18 is moved to an intermediate position between 8% and 40% of the total piston stroke, the first and fourth apertures 24, 30 are partially closed and the second and third apertures 26, 28 are at least partially opened. This intermediate position corresponds to a throttled rotational speed in the first direction of rotation. In the middle position of the control piston, which is between 40 and 60% of the total piston stroke, the first and second apertures 24, 26 and the third and fourth apertures 28, 30 are approximately the same size. The hydraulic motor 2 is therefore not running. The area of the middle position of the control piston can represent a steep area 52 of the curve of the aperture cross-section as the aperture cross-sections rapidly change in that area.

If the control piston 18 is further moved, the first and fourth apertures 24, 30 are further closed and the second and third apertures 26, 28 are further opened. This position corresponds to a throttled rotational speed in the second rotational direction opposite the first direction of rotation. In the second end position corresponding to a piston stroke of 92% to 100% of the total piston stroke of the control piston 18, the second and third apertures 26, 28 are fully open and the first and fourth apertures 24, 30 are fully closed. This position corresponds to a maximum rotational speed in the second direction of rotation.

The areas outside the middle position are flat areas 54 of the changes of the aperture cross-sections. The specified percentages should be regarded merely by way of example. The percentages between the individual positions can be varied according to requirements.

So, in the middle position of the hydraulic valve 8, there is a short circuit between the pump connection P and the tank connection T, so that only a portion of the delivery flow of the hydraulic pump 4 flows via the hydraulic motor 2. The rest flows directly from the hydraulic pump 4 to the tank 14 via the short circuit. By adjusting the hydraulic valve 8, the ratio of these two partial flows is adjusted to set the rotational speed of the hydraulic motor 2. The short circuit always occurs if both the pump connection P and the tank connection T are connected to the same working connection A or B. This is practical in all positions of the hydraulic valve 8 outside of the end positions. In the flat area 52, this short circuit is particularly pronounced because the direction of rotation of the hydraulic motor 2 is reversed there, whereby the hydraulic motor 2 can come to a standstill.

The entire delivery flow of the hydraulic pump 4 then flows directly from the hydraulic pump 2 into the tank 14. Without this short circuit, the speed of the hydraulic motor 2 would depend solely on the delivery flow of the hydraulic pump 4, no matter which position the hydraulic valve 8 is in.

LIST OF REFERENCE SIGNS

1 Fan drive device
2 Hydraulic motor
4 Hydraulic pump
6 Fan
8 Hydraulic valve
10 Pump line
12 Tank line
14 Tank
16 Check valve
18 Control piston
20 Control cylinder
22 Control edge
24 First aperture (P-A)
26 Second aperture (P-B)
28 Third aperture (A-T)
30 Fourth aperture (B-T)
32 Spring
34 Pilot valve
36 Housing
38 Housing main body
40 First end plate
42 Second end plate
44 Connector
46 Output shaft
48 Gearwheel
50 Pilot pressure fluid line
52 Steep area
54 Flat area
A First working connection
B Second working connection
P Pump connection
T Tank connection
T1 First auxiliary connection
T2 Second auxiliary connection

What is claimed is:
1. A fan drive device, comprising:
 a hydraulic motor configured to be directly coupled to a fan, the hydraulic motor including a first working connection, a second working connection, and a constant displacement volume; and
 a hydraulic valve configured to be operably connected to a constant displacement volume hydraulic pump, the hydraulic valve having a pump connection and a tank connection, wherein
 the hydraulic valve includes two fluid connections, each of which is configured to be fluidically connected to the hydraulic motor,
 the hydraulic valve is designed as a proportional valve including a continuously adjustable control piston proportional to a control current of the hydraulic valve, the hydraulic valve is a sole hydraulic control mechanism within the fan drive device for controlling a speed of the fan, the control piston is axially movably mounted in a control cylinder and includes a first control edge which defines a first variable aperture, a second control edge which defines a second variable aperture, a third control edge which defines a third variable aperture, and a fourth control edge which defines a fourth variable aperture, the pump connection is configured to be connected to the first working connection only via the first variable aperture, the pump connection is configured to be connected to the second working connection only via the second variable aperture, a tank connection is permanently connected to a first auxiliary chamber of the control cylinder and a second auxiliary chamber of the control cylinder, the first working connection is configured to be connected to the first auxiliary chamber only via the third variable aperture, the second working connection is configured to be connected to the second auxiliary chamber only via the fourth variable aperture, the first variable aperture is associated with the fourth variable aperture such that the first variable aperture and the fourth variable aperture both move in respective closing directions in unison and both move in respective opening directions in unison, the second variable aperture is associated with the third variable aperture such that the second variable aperture and the third variable aperture both move in respective closing directions in unison and both move in respective opening directions in unison, and at a control piston position outside a first end position and a second end position, respective aperture cross-sections of the third variable aperture and the fourth variable aperture are greater than respective aperture cross-sections of the associated first variable aperture and second variable aperture.

2. The fan drive device according to claim 1, wherein:
the control piston is positionable at (i) the first end position in which the first working connection is connected to the pump connection and the second working connection is connected to the tank connection, (ii) the second end position in which the first working connection is connected to the tank connection and the second working connection is connected to the pump connection, and (iii) a middle position of a piston stroke of the control piston which is located between the first end position and the second end position, wherein when the control piston is positioned at the middle position the third variable aperture defines a first aperture cross-section, when the control piston is positioned at the middle position the fourth variable aperture defines a second aperture cross-section, and the first aperture cross-section and the second aperture cross-section have the same size.

3. The fan drive device according to claim 2 wherein when the control piston is positioned at the middle position:
each of the first aperture cross-section and the second aperture cross-section in the middle position is at least 30% of their respective maximum aperture cross-section, and the first variable aperture and the second variable aperture are fully closed or feature respective aperture cross-sections that are at most 90% of the first aperture cross-section.

4. The fan drive device according to claim 2, wherein:
when the control piston is positioned at the middle position, an aperture cross-section of the first variable aperture and an aperture cross-section of the second variable aperture are the same size.

5. The fan drive device according to claim 2, wherein the first end position is a spring-pretensioned first end position.

6. The fan drive device according to claim 2, wherein:
the first aperture cross-section and the second aperture cross-section in the middle position is at least 35% of their respective maximum aperture cross-section, and the first variable aperture and the second variable aperture are fully closed or feature respective aperture cross-sections that are at most 90% of the first aperture cross-section.

7. The fan drive device according to claim 1, wherein:
the control piston is positionable at a plurality of positions outside of the first end position and the second end position, the third variable aperture and the fourth variable aperture are open at the plurality of positions outside of the first end position and the second end position, and the first and second aperture cross-sections depend on a piston stroke of the control piston at each of the plurality of positions.

8. The fan drive device according to claim 1, wherein aperture cross-sections of the first variable aperture and the fourth variable aperture decrease monotonically with an increasing piston stroke of the control piston from a location at which each of the first variable aperture, the second variable aperture, the third variable aperture, and the first variable aperture are open.

9. The fan drive device according to claim 1, wherein:
each of the first variable aperture, the second variable aperture, the third variable aperture, and the fourth variable aperture defines a respective flat area and a respective steep area in a respective curve of respective aperture cross-sections versus piston position;

each of the respective flat areas identifies a closed condition of the respective variable aperture; and each of the respective steep areas identifies an open condition of the respective variable aperture.

10. The fan drive device according to claim 9, wherein;
the respective aperture cross-sections of the third variable aperture and the fourth variable aperture at respective transitions between the respective flat area and the respective steep area of the respective associated first variable aperture and second variable aperture is 15% of a maximum aperture cross-section of the respective third variable aperture and the respective fourth variable aperture.

11. The fan drive device according to claim 1, wherein:
the hydraulic motor is a gear motor and includes a housing having a main body which is arranged between a first end plate and a second end plate, and the control piston, a spring, and a solenoid valve are arranged inside or on the first end plate.

12. The fan drive device according to claim 11, further comprising a pilot valve arranged within or on the first end plate.

13. The fan drive device according to claim 11, wherein the gear motor has an external gear cog.

14. The fan drive device according to claim 1, wherein a maximum area of the first variable aperture, the second variable aperture, the third variable aperture, and the fourth variable aperture is 126.45 mm².

15. The fan drive device according to claim 1, wherein the hydraulic valve is electrically or hydro-electrically controlled by the control piston and either directly controlled by a control current or the control current controlling a pilot valve which controls a fluid pressure on the control piston.

* * * * *